Dec. 16, 1969  H. FÜHR  3,484,324
APPARATUS FOR JOINING HETEROGENEOUS MATERIALS SUCH
AS PAPER OR CARDBOARD, EMPLOYING THERMOPLASTIC
FOILS AND APPLYING OF PRESSURE AND HEAT
Filed April 20, 1965  3 Sheets-Sheet 1

INVENTOR:
Hans Führ

By  Cab thein.
Agent

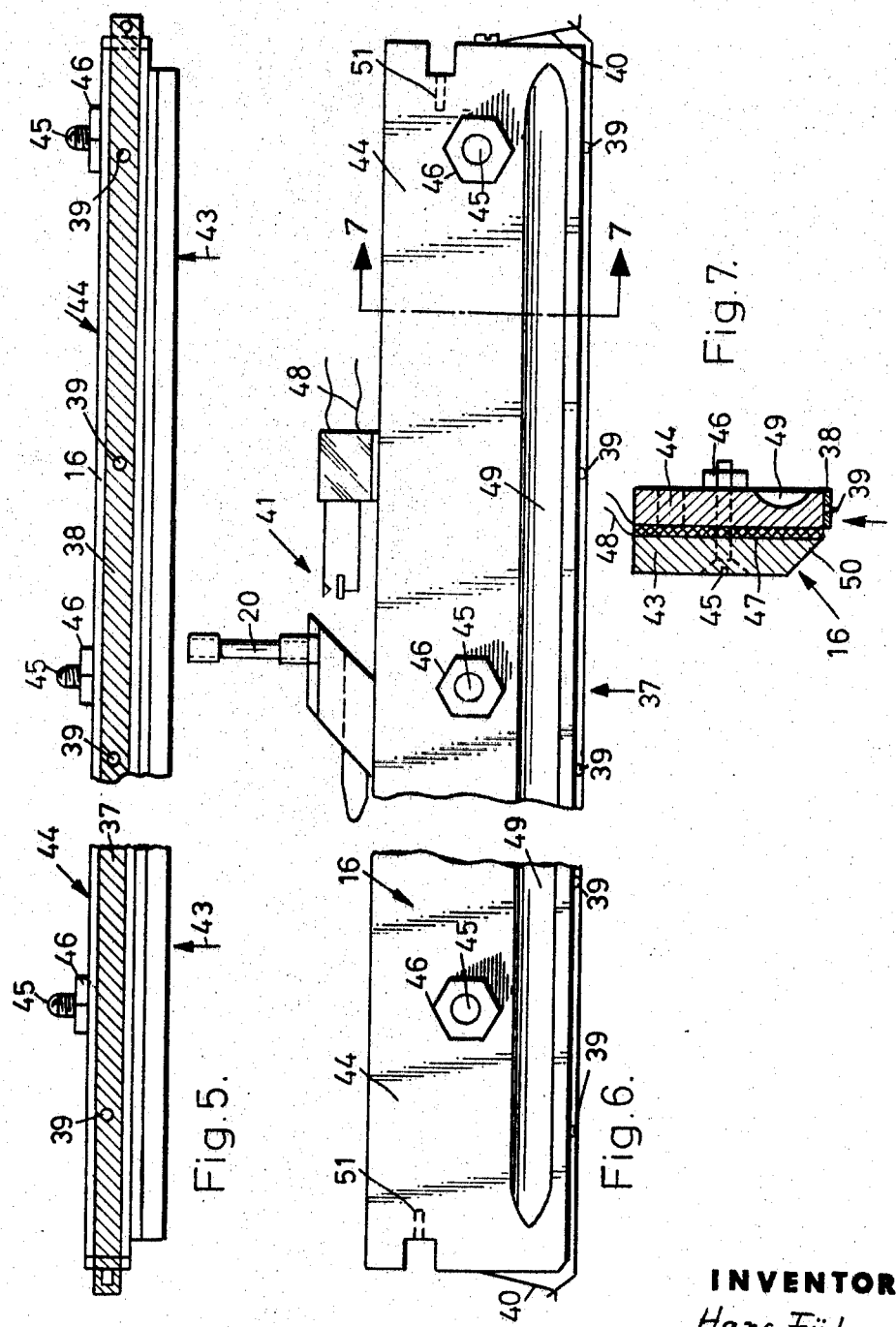

INVENTOR:
Hans Führ

By [signature]
Agent 3,484,324
APPARATUS FOR JOINING HETEROGENEOUS MATERIALS SUCH AS PAPER OR CARDBOARD, EMPLOYING THERMOPLASTIC FOILS AND APPLYING OF PRESSURE AND HEAT
Hans Führ, Cologne, Germany, assignor to Alpina-Werk Bovensiepen KG, Kaufbeuren, Germany
Filed Apr. 20, 1965, Ser. No. 449,596
Claims priority, application Germany, Oct. 23, 1964, A 47,406
Int. Cl. B32b 31/08
U.S. Cl. 156—515                        16 Claims

ABSTRACT OF THE DISCLOSURE

Apparatus for successively joining sheets of heterogeneous materials, employing thermoplastic foils are well as pressure and heat, with means for inserting a portion of a foil between two sheets of material to be joined, causing the foil portion to melt so as to connect said sheets permanently, and cutting off said foil portion from the remainder of the foil, as well as subsequently tearing off said foil portion. A heater bar is provided for melting the foil portion; a chopper bar is pivotably disposed at the end of a foil table; and other structural expedients are used to perform the aforesaid steps in the novel joining method according to the invention.

---

The invention relates to an apparatus for successively joining heterogeneous materials such as paper or cardboard, employing thermoplastic foils and applying pressure and heat.

It is known to insert automatically a thermoplastic foil between two loose layers or sheets, e.g. of paper, of which a writing material is composed, and then for a hearing strip to melt the foil so that the two layers are joined securely together, whereupon the foil is mechanically parted.

The disadvantage of this method is that the operating stages which lead to parting of the foil do not take place in a timed sequence such that the parting operation could be carried out in a functionally reliable, i.e. uninterrupted and trouble-free fashion with a known apparatus, the foil melts over the edge of a knife for parting the foil.

A further disadvantage is that the foil melts unevenly and still partly protrudes between the sheets, or adheres firmly to the heating strip, and so either produces a dirty appearance of the welded spine of the individual sheets or causes a breakdown in operation because residues of foil must first be removed from the apparatus or pieces of foil are left adhering to the paper, with the result that too long a piece of foil is pulled off the supply roll.

It is a further disadvantage of the known method that, with different thicknesses of paper to be welded, different welding times are needed because the heat insulation of too thick a paper means that the underlying foil is not melted sufficiently and does not penetrate the paper through capillary action as it would if the sheets of paper were very thin.

The invention aims to overcome the above-mentioned disadvantages by conducting the process and constructing the apparatus so that sheets of the most widely diverse thicknesses are reliably welded together by interposed thermoplastic foils, in rapid sequence, the welding points having a clear appearance, with no foil residue of any kind remaining in the apparatus and necessitating cleaning.

According to the invention, there is provided a method of joining heterogeneous materials such as paper or cardboard, employing thermoplastic foils and the application of pressure and heat, the method comprising the steps of inserting a portion of a thermoplastic foil between two adjacent layers or sheets of materials to be joined, causing the foil portion to melt e.g. by means of a heater bar, so that the two layers are connected permanently, and cutting off the foil portion from the remainder of the thermoplastic foil, wherein the heater bar preferably compresses the sheets and the foil portion to melt between them for a sufficiently long time so that a chopper bar, located beneath the foil protruding from the foil portion between the sheets, can move upwardly past and at a short distance from means for cutting and draw the foil upwardly, while said portion of the same is melting, and subsequently tearing off the foil portion adjacent the cutting means.

The apparatus according to the invention does not, as in previous embodiments, utilize the melting of the foil at the knife edge and a downward movement, but the reverse in that, during the welding or upon termination of the welding time, the chopper bar disposed underneath the cold part of the foil is pivoted upwardly. The foil is firmly held by a feed mechanism so that the upwardly pivoting chopper bar cannot pull a further piece of foil from the supply roll. The foil can therefore give only at the point where it is the weakest, and that is at the welding point. As the chopper bar engages over the entire width of the foil strip, the foil tears where its mechanical strength is at the minimum. During the tearing process, the foil is still carried upwardly so that, if anything, the edges of the paper sheets which are to be welded will be enclosed.

The strength of the weld is thus enhanced and, at the same time, all the welding points achieve a clean appearance. The sheets are therefore embedded to a certain extent in thermoplastic material if the weld can be continued further upwardly over the welded edges of the sheets.

Another possible way of conducting the process resides in providing apertures in the upper sheet of paper prior to welding, in the area to be welded, said apertures permitting penetration of the welding material, e.g. the thermoplastic foil, while it is in the plastic state, and subsequently to provide means of separating the foil portion from the strip.

With this alternative therefore, there is no welding around the spine but within the sheets. The synthetic plastic material, hardening after the welding and which also penetrates the sheets by capillary action, therefore forms to a certain extent a framework because the apertures in each sheet link the thermoplastic material with the next layer.

With regard to said apertures, an appropriate, exemplary apparatus consists in that the heater bar, which presses the sheets and the foil melting between them together, has points on it, spaced at intervals, which are adapted to produce apertures in the top sheet to permit the penetration of the melting foil.

With this apparatus, therefore, the perforations or apertures are made by the heater bar simultaneously producing these apertures, thus making it possible for the material, melting under the action of pressure and heat from the heater bar to have access via these apertures to the other layer. All the apertures should preferably be aligned above one another. The points on the heater bar are preferably of conical shape.

An exemplary apparatus according to the invention is preferably so constructed that the heater bar is formed by two metal pieces laterally enclosing and pressing a heating element while the pressure face of one of the metal pieces, adjacent the heating element, is covered with a plastic, preferably polytetrafluoroethylene foil.

By reason of having the heater bar constructed in this manner, the heating effect of the heating element is directed towards the pressure face, and the foil cover thereon prevents the liquefied thermoplastic foil adhering to the pressure face and making it dirty.

Important to perfect welding is that the side of the heater bar which is opposite to the pressure face should have a thermostatic temperature controller, e.g. a bimetal controller.

The metal pieces which enclose the heating element have the effect of storing heat so that, even with rapidly successive welding operations, no excessively great cooling effect occurs. Regulation of the welding temperature is achieved on the side facing away from the welded point so that fluctuations in temperature occurring between the individual welding times have only a minimal effect.

It is furthermore important to even welding and particularly to smooth tear-off of the foil that the heater bar be pivotally mounted in bearings and that the material on which the pressure face of the heater bar abuts be a material of low heat conductivity, such as silicone rubber. By adopting this measure it is possible for the heater bar pressed down onto the welding point to be so adjusted, as it has a resilient abutting face, that the tearing-off operation along the knife of the heater strip can easily take place. The abutting face is of low heat conductivity, so that silicone rubber is ideal.

In order to ensure that the edges of the paper sheets which are to be welded together are exactly superimposed and are not staggered after the welding, it is important for a stop bar to be provided above the chopper bar, against which the edges of the paper to be welded can rest.

The welding itself can also be controlled by having a time-controlled contact provided, e.g. a time switch, operating in the heater bar circuit. By adjusting the welding time it is possible to allow for extreme differences in sheet thicknesses or in the heat conductivity of different grades of paper. The welding temperature is, however, kept constant, because this is important for trouble-free separating of the foil after the welding process.

The apparatus may be structurally simplified in that the chopper bar, arranged in the plane of a foil table, forms a pivoting part on the end of the foil table.

If it is desired not to tear off but to part the foil, then there is a possibility of forming the heater bar so that the knife edge thereof has a cutting edge which serves for parting the foil.

In conjunction with the resilient abutment and adjustment facility of the heater bar by mounting the same in bearings, it is possible also to achieve separation of the foil by the melting action.

It is furthermore important for the gap between the heated knife edge and the chopper bar to be adjustable.

By this means it is possible to determine the form of the welded seam on the end face of the sheets which are to be welded together. If a gap is left between the heated knife edge or heater bar, as the case may be, and the chopper bar, then the effect of the gap is that, when the foil is torn off in the molten state, a few tenths of a millimeter of the foil are torn out from the welded spine, producing a clean welded edge.

If no gap is left or if the gap left is only a very small one, then the individual sheets are welded in by the circumstance that the synthetic plastic material of the individual pieces of foil inserted between the sheets becomes joined together.

Further features of the invention will now be described by way of example, with reference to the accompanying drawings, in which:

FIG. 5 shows the heater bar as seen in the direction of a pressure face;

FIG. 6 is a plan view of the heater bar shown in FIG. 5;

FIG. 7 is a cross-sectional view taken along the line 7—7 of FIG. 6;

Figure 1:
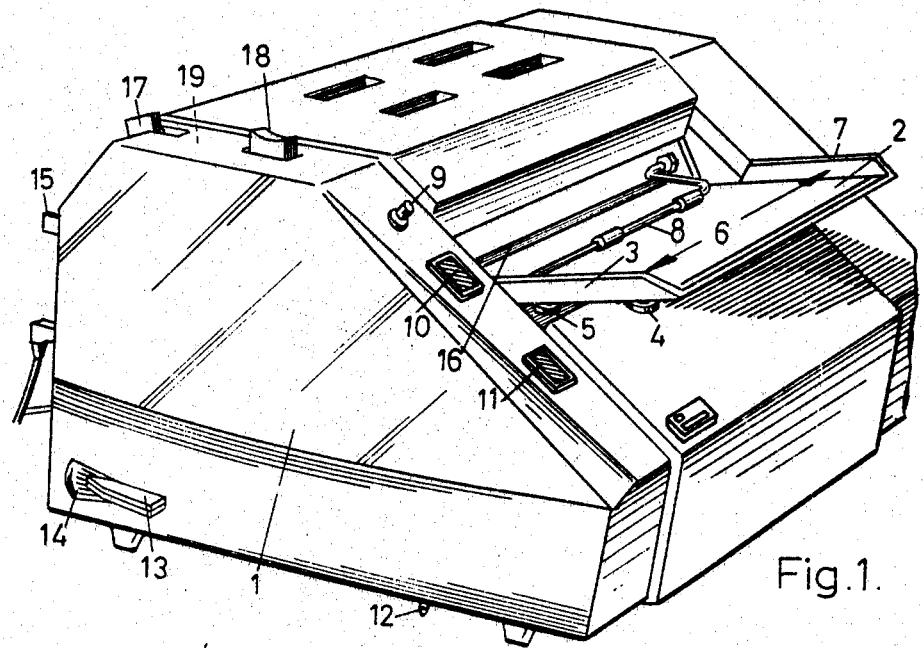
FIG. 1 shows a preferred embodiment of an apparatus according to the invention.

In FIG. 1, reference numeral 1 denotes a housing for an exemplary apparatus for single-sheet welding according to the invention. The paper lay-on a table 2 has a lateral stop 3 which can be adjusted by means of knurled screws 4 and 5 so that a gap 6 between the adjustable stop 3 and a further stop 7 can be adjusted. It is therefore possible to set the gap 6 to such a width that the stops 3 and 7 engage the edges of a stack of paper to be welded whatever the width of the sheets of paper may be. A paper retaining bar 8 pivotally journaled above table 2 prevents the sheets from sliding during the welding operation when the same are of different format.

By means of a release button 9 conveniently disposed on the front of the apparatus, within easy reach of the operator, it is possible to lower the paper retaining bar 8 independently of other operations, by conventional mechanism not shown. A warning light 10, also on the front panel, and connected to the electric control circuit (not shown), is extinguished when the temperature to which a thermostat is adjusted has been reached. An operating warning light 11, similarly on the front of the apparatus, comes on when a switch 12 (see the left-side bottom edge of the apparatus, as shown in FIG. 1) is moved from its "Off" to its "On" position. A knob 13 is provided closer to the rear of the left side, by which a time switch (not shown) is controlled for adjusting welding times of various lengths; an appropriately calibrated scale 14 is associated with the knob 13.

Figure 11:
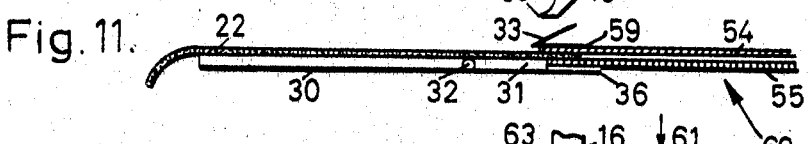
Figure 12:
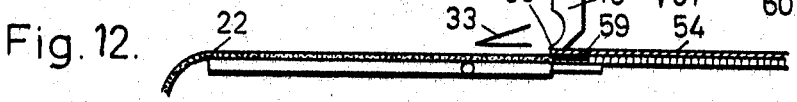

On the left rear of the apparatus, a release button 15 is disposed, associated with the internal mechanism by conventional means not shown; when depressed, the button renders movements of a heater bar 16 and the paper lay-on table 2 ineffective. A resilient pressure face of the heater bar is described somewhat later with reference to FIGS. 5 to 7, and so is an associated knife edge, as shown in FIGS. 11 and 12. Along the left top edge of the apparatus, a switch 17 is shown which is provided to render the following manoeuver dependent upon the subsequent operation of a key 18 (more forwardly on the top) when the latter is depressed. If switch 17 is moved to the forward position 19 then the result is partly automatic change-over to the individual stages of the operation, as will be described hereinafter. It should be noted that the operating and control elements 9 to 15 and 17 to 19 are conventional expedients in apparatus of this kind, are not considered to form an integral part of the invention, and are not described further.

Figure 3:
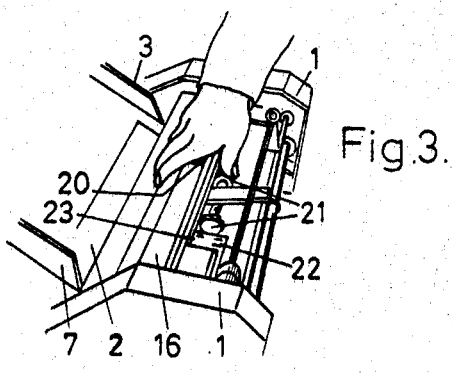
FIG. 3 is a partial view of the apparatus shown in FIG. 1 with a cover removed, and showing a heater bar and the foil transport mechanism.
Figure 2:
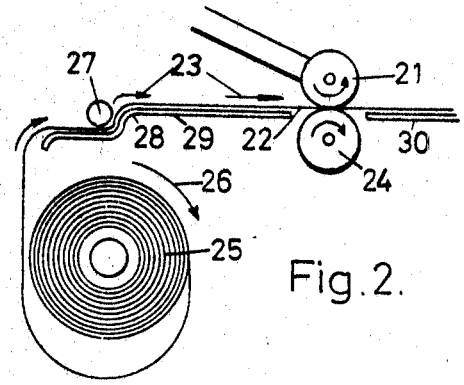
FIG. 2 shows schematically a foil transport mechanism with a supply roll.
Figure 4:
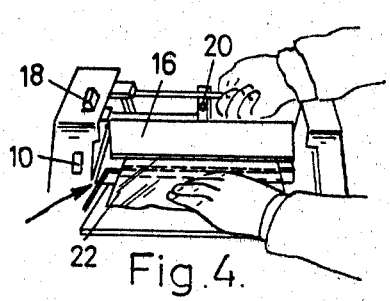
FIG. 4 shows the apparatus from the front, with the foil pulled out.

In FIGS. 3 and 4, the top cover of the apparatus is removed. Looking into the machine from above, one can see the heater bar 16 and a thermostat setting knob 20. A thermoplastic foil 22 is moved by foil transport rollers 21 in the direction of an arrow 23 at every pressure of the key 18. As shown in FIG. 2, counter rollers 24 are located underneath foil 22. The foil is unrolled from a supply roll 25 in the direction of an arrow 26. A clamping roller 27, in conjunction with a shoulder 28 on a guide plate 29, ensures that the foil 22 is not pulled in the direction of arrow 23 when the same is torn off by a chopper bar 31. Arranged after the foil transport rollers 21 and counter-rollers 24 is a foil table 30.

As can be seen from FIGS. 10 to 14, the foil table 30 is followed by the chopper bar 31 which is disposed at the end of the foil table 30 and pivots about a bearing 32. Above the foil 22 is a stop bar 33 for the individual sheets of paper. The paper laying-on table 2 is guided up and down along a guide strip 34, rigid with the housing, at right angles to the said guide strip, in the direction of an arrow 35, according to the corresponding stage in the operation. To simplify the illustrations in FIGS. 11 to 13, the paper laying-on table 2 has been omitted and similarly the sheets of paper are shown in a plane corresponding to that of the foil and not in their actual position, as is shown in FIGS. 10 to 14. In the paper laying-on table 2 is an abutting face 36 made from heat-insulating material. The face 36 is secured in the paper laying-on table 2.

It should also be noted that a resilient abutting pressure face 37 of the heater bar 16 (FIGS. 5 to 7) has a foil covering 38 which prevents the melting plastic foil 2 adhering to the pressure face of heater bar 16. It has been found expedient to use polytetrafluoroethylene for this foil covering.

If the method is used which produces perforations in the paper, then points 39 are also provided on the pressure face 37, to penetrate the foil coating 38. This foil coating can be stretched over the pressure face 37 by springs 40 but can also be stretched around the pressure face 37 and gripped by retainer bars.

At the opposite end of the pressure face 37 is a thermostatic controller 41 which is operated for example by a bimetallic strip. The heater bar 16 is formed by two pieces of metal 43, 44 which are locked together by screws 45 and counter-nuts 46. A heating element 47 is enclosed between the pieces 43 and 44, and has terminals or wires 48 which are connected to the thermostic controller 41.

Provision is made, by means of recesses 49 in the metal piece 44 and chamfered portions 50 on the metal piece 43, for the heat from the heating element to be directed towards the pressure face 37. Lateral bearing apertures 51, in conjunction with pins secured on the moving mechanism, make it possible automatically to adjust the heater bar in the welding position.

Figure 8:
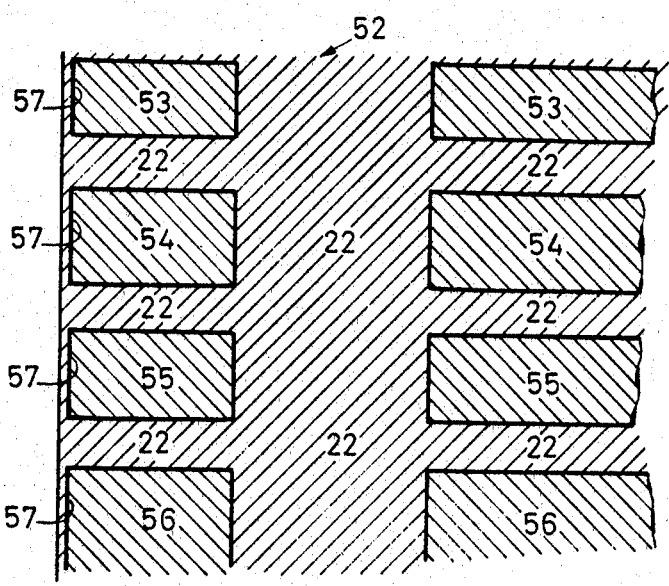
FIG. 8 shows, in enlarged schematic form, the product obtained when using perforating and welding stages on the edges of the spine of the sheets to be welded together.
Figure 9:
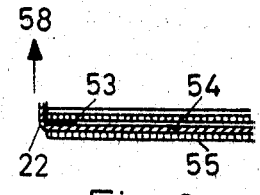
FIG. 9 shows schematically the inventive process when welding along the edge of the spine.

FIGS. 8 and 9 show various possibilities of carrying out the method of the invention. In FIG. 8 the thermoplastic foil 22 is distributed among sheets of paper 53, 54, 55 and 56 which are to be welded together, owing to the presence of apertures 52 produced by points 39. According to the adjustment of the chopper bar 31, edges 57 which are to be welded can also be covered by the synthetic plastic compound or foil 22.

FIG. 9 shows in an enlarged form how the thermoplastic foil 22 is drawn upwardly during the melting process by the chopper bar 31 in the direction of an arrow 58.

Using the apparatus described, as well as the novel method, the working of the arrangement is as follows, reference being made to FIGS. 10 to 14. According to FIG. 10 a sheet of the paper 55 is placed on the paper laying-on table 2. Pressure on key 18 moves the foil transport rollers 21 which push the foil, as is shown in FIG. 11, a distance, i.e. approx. 3–5 mm., over the guide strip. A piece 59 of foil which is to be welded projects sufficiently beyond the end of the chopper bar 31 for the stop bar 33, which is lowered as shown in FIG. 11, to cover this portion.

In the meantime, the paper laying-on table 2 has travelled upwardly in the direction of an arrow 60 and is resting against the underside of the stop 33. The heater bar 16 is still at a distance from stop bar 33. Now, in the position as shown in FIG. 11, the next sheet which is to be welded is laid on the sheet 55. The stop bar 33 ensures that the ends, i.e. the parts of sheets 54 and 55 which are to be welded, are vertically above each other, the foil portion 59 being interposed between them.

Figure 10:
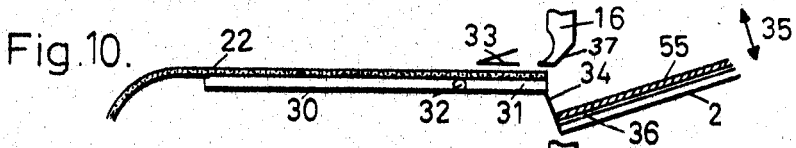
FIGS. 10 to 14 show individual stages in the operation when using a chopper bar located underneath the foil and a stop bar thereabove.
Figure 13:
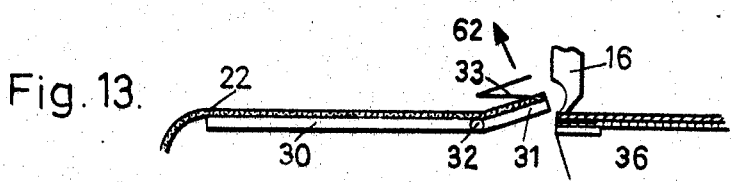

A further pressure on key 18 results in the stop bar 33 being restored to the position of rest shown in FIG. 10 and the heater bar 16 being moved downwardly in the direction of an arrow 61 (see FIG. 12). It now presses against the resilient abutting face, with sheet 54, foil 59 and sheet 55 being all interposed. Welding, the time of which is adjusted by means of switch 13, of the foil 59 to the sheets 54 and 55 now takes place, and throughout the welding time the heated heater bar is pressed against the location of the weld. When the welding time ends, the chopper bar 31 swivels about its bearing 32 in the direction of an arrow 62, as shown in FIG. 13. It swivels closely past a knife edge 63 of the heater bar 16 (see FIGS. 11, 12), pulling the foil 22 upwardly, in the direction of arrow 58, as shown in FIG. 9.

Figure 14:
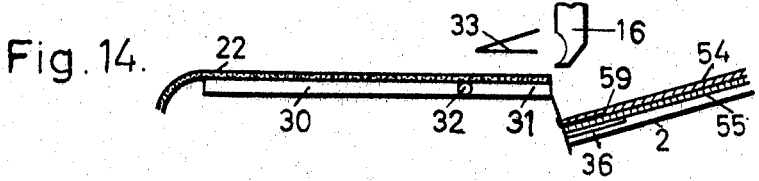

Stop bar 33, chopper bar 31, heater bar 16 and paper laying-on table 2 then return to their positions of rest as shown in FIG. 14. The same operation is then repeated, as started in accordance with FIG. 10, namely by a further sheet 53 or 56 being laid on so that the operation can be re-commenced. If the switch 17 is set to "automatic," i.e. into the position 19, then the position shown by FIG. 14 will not arise after the welding operation, and following on from FIG. 13, the parts involved will immediately resume the position shown in FIG. 11, thus shortening the working operation.

In application, the invention has all possibilities in the fully or semi-automatic joining together of individual sheets of paper so that the material of a molten synthetic plastic foil penetrates by capillary action into the sheets being welded together. If need be, and if apertures 52 or tools such as are represented by chopper bar 31, are provided, the synthetic plastic of the individual layers can be applied in a communicating manner, thus forming a plastic framework which encloses the sheets welded together.

I claim:

1. An apparatus for successively joining separate sheets of heterogeneous materials such as paper and cardboard, employing thermoplastic foils as well as pressure and heat, comprising, in combination, a heater bar disposed transversely of the path of said sheets and one of said foils through the apparatus, a chopper bar located beneath said heater bar and beneath the foil protruding from a portion thereof, said foil portion being inserted between two adjacent sheets of material to be joined, said chopper bar being movable with respect to and toward said heater bar, and means for cutting the foil and for drawing the same upward while said foil portion is made to melt, wherein said cutting means is in the form of a knife edge formed on a portion of said heater bar, which faces said chopper bar, and wherein said foil portion is parted from the remainder of said foil by the movement of said chopper bar and its interaction with said knife edge and with an abutting face of said heater bar, having low heat conductivity.

2. The apparatus as defined in claim 1, further comprising means for adjusting the distance between said knife edge and said chopper bar.

3. The apparatus as defined in claim 1, wherein said heater bar is provided with spaced points which produce apertures in the upper one of said sheets to allow the penetration of the molten foil portion.

4. The apparatus as defined in claim 1, wherein said heater bar is formed from two pieces laterally enclosing and pressing together at least one heating element, and wherein a pressure face of one of said parts, adjacent said heating element, constitutes said abutting face and is covered with a plastic foil.

5. The apparatus as defined in claim 4, wherein the cover foil is polytetrafluoroethylene.

6. The apparatus as defined in claim 1, further comprising a temperature controller arranged on the side of said heater bar which is opposite from the face which compresses said foil portion and said sheets.

7. The apparatus as defined in claim 6, wherein said temperature controller is in the form of a bi-metal strip.

8. The apparatus as defined in claim 1, further comprising table means on which said sheets rest, wherein said heater bar is pivotally mounted in bearings, and wherein an upper face of said table means, which cooperates with a lower face of said heater bar, to compress said foil portion and said sheets, is made from a material with low heat conductivity.

9. The apparatus as defined in claim 8, wherein said cooperating face is made from silicone rubber.

10. The apparatus of claim 1, further comprising a stop bar positioned above said chopper bar, against which the edges of sheets to be welded can rest.

11. The apparatus of claim 1, wherein said heater bar is electrically heated.

12. The apparatus as defined in claim 11, further comprising a time-control contact included in the circuit of said heater bar.

13. The apparatus as defined in claim 12, wherein said contact is in the form of a time switch.

14. The apparatus of claim 1, further comprising a laying-on table on which said sheets rest, a foil table on which said foil portion rests, and means for adjusting the distance of said laying-on table from said foil table.

15. The apparatus as defined in claim 14, wherein said chopper bar is arranged in the same plane as said foil table.

16. The apparatus as defined in claim 14, wherein said chopper bar is a pivoting portion on the end of said foil table.

References Cited

UNITED STATES PATENTS

| | | | |
|---|---|---|---|
| 2,153,351 | 4/1939 | Steinberger | 156—251 |
| 3,196,067 | 7/1965 | Techtmann | 156—583 |
| 3,243,487 | 3/1966 | Smith | 156—583 |
| 3,060,075 | 10/1962 | Kincaid | 156—510 |

DOUGLAS J. DRUMMOND, Primary Examiner

U.S. Cl. X.R.

156—583